(12) United States Patent
Kiesewetter

(10) Patent No.: US 7,602,352 B2
(45) Date of Patent: Oct. 13, 2009

(54) FLUSH-FITTED INSTRUMENT CLUSTER FOR A MOTOR VEHICLE

(75) Inventor: Thomas Kiesewetter, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 721 days.

(21) Appl. No.: 11/270,126

(22) Filed: Nov. 9, 2005

(65) Prior Publication Data
US 2006/0114571 A1 Jun. 1, 2006

(30) Foreign Application Priority Data
Nov. 12, 2004 (DE) ............... 10 2004 054 771

(51) Int. Cl.
G09G 5/00 (2006.01)
G02B 27/10 (2006.01)

(52) U.S. Cl. ............... 345/7; 345/4; 359/630; 353/14

(58) Field of Classification Search ............... 345/4–9; 353/14; 359/13, 630; 340/461; 33/264
See application file for complete search history.

(56) References Cited

U.S. PATENT DOCUMENTS

| 4,636,782 | A | | 1/1987 | Nakamura et al. |
|---|---|---|---|---|
| 5,161,480 | A | | 11/1992 | Furuya et al. |
| 5,576,886 | A | | 11/1996 | Ferrante |
| 6,100,943 | A | * | 8/2000 | Koide et al. ............... 349/11 |
| 6,337,672 | B1 | * | 1/2002 | Inoguchi et al. ............... 345/1.1 |
| 6,556,515 | B1 | * | 4/2003 | Sekiguchi ............... 368/242 |
| 6,611,243 | B1 | * | 8/2003 | Moseley et al. ............... 345/4 |
| 6,621,471 | B1 | * | 9/2003 | Ozaki et al. ............... 345/4 |
| 6,674,497 | B2 | * | 1/2004 | Brandt ............... 349/74 |
| 6,703,988 | B1 | * | 3/2004 | Fergason ............... 345/7 |
| 2004/0189546 | A1 | * | 9/2004 | Sumiyoshi ............... 345/8 |
| 2007/0171142 | A1 | * | 7/2007 | Ikarashi et al. ............... 345/4 |

FOREIGN PATENT DOCUMENTS

| JP | 2002079848 | 3/2002 |
|---|---|---|
| WO | WO 99/22960 | 5/1999 |
| WO | WO 2005/018976 A1 | 3/2005 |

* cited by examiner

Primary Examiner—David L Lewis
(74) Attorney, Agent, or Firm—Kenyon & Kenyon LLP

(57) ABSTRACT

A flush-fitted instrument cluster for a motor vehicle includes a first display device, a second display device, and a reflecting optical combination device. The first display device (2) displays a first image located in a direct field of vision (3) of a viewer. The first image includes a background surface area (2c). The second display device (4; 40, 41) is arranged at an angle to the first display device (2) and displays a second image including a background surface area (40a, 42a; 41a, 43a). The reflecting optical combination device (5) selectively displays the second image in the field of vision (3) of the viewer with the first image. The first image and the second image are not completely overlapping in the field of vision (3) of the viewer to form an overlapping surface area (40a, 41a) and non-overlapping surface area (42a, 43a). When the background surface area (40a, 42a; 41a, 43a) of the second display device (4; 40, 41) and the background surface area (2c) of the first display device (2) have varying degrees of luminance between the overlapping surface area (40a, 41a) and the non-overlapping surface area (42a, 43a), at least one of transparency and brightness of the non-overlapping surface area (42a, 43a) is adjusted to minimize an unwanted jump in brightness.

9 Claims, 2 Drawing Sheets

FLUSH-FITTED INSTRUMENT CLUSTER FOR A MOTOR VEHICLE

CROSS REFERENCES TO RELATED APPLICATIONS

This application claims priority to German Patent Application No. 10 2004 054 771.8 filed in Nov. 12, 2004.

STATEMENT REGARDING FEDERALLY SPONSORED RESEARCH

Not Applicable.

DESCRIPTION OF THE BACKGROUND ART

The invention relates to a flush-fitted instrument cluster for a motor vehicle, with an electronic display device, such as an organic light emitting diode (OLED) display device, which emits imaging light and is positioned in the direct field of vision of a viewer, with at least one illuminated and/or self-luminous electromechanical display device, which is positioned at an angle to the electronic display in the field of vision of the viewer and which is movable (reflectable) into the field of vision of the viewer by means of an electromechanical display device for the imaging light with the reflecting optical combination device in addition or alternatively to the electronic display.

The amount of information displayed to a driver of a motor vehicle as a result of the growing number of comfort features, such as navigation equipment, telecommunication equipment, and driver support systems, which are available from the various selections, increases continuously. This is the reason why many vehicles already use so-called multifunction control units, which are located in the center console, for instance. With this type of layout, the driver has to take his eyes off the road in order to receive this information. For this reason, it is advantageous if at least part of this information can be displayed in the instrument cluster within the driver's field of vision.

In order to solve this problem by providing only a certain display surface in the instrument cluster in addition to the indicating gauges for speed, RPM, etc., a flush-fitted instrument cluster as mentioned at the outset was developed (German patent application 103 33 745.8, no prior publication). In this flush-fitted instrument cluster, the display device and the electromechanical display device are specifically arranged in relation to each other, so that they are always located within the viewer's field of vision. While the display device, which is provided in the form of a liquid crystal display, an OLED display or any other type of display, is physically located in the instrument panel of the vehicle within the viewer's field of vision, the electromagnetic display equipment, which has the indicating elements of a conventional instrument cluster, such as round gauges like speedometers, is arranged at an angle in relation to the electronic display, outside of the driver's field of vision. A multifunction device, preferably in the form of a semitransparent mirror, is positioned between the electronic display device and the electromechanical display device in such a way that it combines the imaging light of the electronic display device and the electromechanical display device as a consolidated display in the viewer's line of vision.

A flush-fitted instrument cluster of this type of design permits simultaneous or alternative display of the electronic display device and of the electromechanical display device. Due to the non-uniform contour geometry of the display device, which typically has a rectangular shape, and the electromechanical display device, which is designed preferably as a round gauge, and because of the different size of these devices, on the one hand, and due to the confined space of the installation sites of the instrument panel in the vicinity of the steering wheel of a vehicle, on the other, this results in an unavoidable, virtual position overlap of the reflected electromechanical display device and the electronic display device that are positioned in the viewer's field of vision. It was found that because of the difference in the brightness of the backgrounds of the electronic display devices and the combination device, a sudden unwanted jump in brightness between the overlapped backgrounds and a non-overlapping background section occurs during a virtual overlap of these devices.

The typical selected background color of electromechanical display devices, for example of a round gauge, is jet-black, i.e., essentially with a brightness of at least 0 candela per $m^2$ (0 $cd/m^2$). A display device, specifically one which is designed as an OLCD display, cannot represent a similar black background, due to design constraints, so that in case of a combined representation of the electronic display device and the electromechanical display device it produces overlapping between the lesser intense black background (brightness greater than 0 $cd/m^2$) of the electronic display device and the jet-black background (0 $cd/m^2$) of the mechanical display device, producing an unwanted jump in brightness between the overlapped surface areas of the background and the one non-overlapping surface area. Accordingly, a need exists for an improved instrument cluster for use in a motor vehicle.

SUMMARY OF THE INVENTION

The object of the present invention therefore is to design a flush-fitted instrument cluster for a motor vehicle of the type mentioned at the outset that minimizes any fluctuations in brightness due to differences in background brightness during the combined display of the electronic display device and the electromechanical display device.

This problem is solved by a flush-fitted instrument cluster for a motor vehicle including a first display device, a second display device, and a reflecting optical combination device. The first display device displays a first image located in a direct field of vision (3) of a viewer. The first image includes a background surface area. The second display device is arranged at an angle to the first display device and displays a second image including a background surface area. The reflecting optical combination device selectively displays the second image in the field of vision of the viewer with the first image. The first image and the second image are not completely overlapping in the field of vision of the viewer to form an overlapping surface area and non-overlapping surface area. When the background surface area of the second display device and the background surface area of the first display device have varying degrees of luminance between the overlapping surface area and the non-overlapping surface area, at least one of transparency and brightness of the non-overlapping surface area is adjusted to minimize an unwanted jump in brightness.

The core of the invention is to develop the traditional non-translucent or light-impermeable background of the electromechanical display device outside of the overlap area of the background of this device and the electronic display device so that it is sufficiently transparent or translucent, to produce an overlap-free background surface area with the same, preferably identical, brightness as the overlapped background surface area, which results from the combination from the dark background of the display device and the lighter background of the OLED display device. The term "proportional" used herein should thus be perceived accordingly.

The aforementioned core of the invention cited as an example also generally applies if the background of the electronic display device is darker than the background of the electromechanical display device, for instance. In actual practice, however, the first version is of special interest because design constraints prevent electronic display devices from reproducing an absolutely black background. The same effect, namely the avoidance of an unwanted jump in brightness during the overlapping of different backgrounds of an electronic display device and a mechanical display device, can also be achieved with the result that the overlapped surface area of the background in which the surface area has been developed to be proportionally transparent or translucent, so that the brightness of the proportioned transparent or translucent non-overlapping background surface area conforms to the brightness of the transparent or translucent surface area, whereby these surface areas are not as black but appear to exhibit uniform brightness.

In order to ensure a uniform dark background for the exclusive display of the content of the electromechanical display device as an alternative to the content of the electromechanical display device within the viewer's field of vision, the invention provides that the transparent or translucent surface area of the display device can be controlled with respect to its transmission and/or brightness, so that the light transparency or translucency in case of combinations is utilized for the benefit of providing a uniform background only.

A preferred arrangement from optical and practical perspectives provides that two spatially separated illuminated and/or self-luminous electromechanical displays are combined with the display device so that the electromechanical displays are positioned on the lateral boundaries of the electronic display device and partially project beyond them. In this case, the display device preferably has a rectangular shape, and the two displays of the display device are designed as round gauges. A jump in brightness during a combined representation of both types of devices along a straight line on the lateral boundaries of the display device would be particularly problematic, because it is placed within the effective area of the round gauges.

The foregoing and other objectives and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF SUMMARY OF THE DRAWINGS

Examples of the invention are detailed in the drawing below, which shows.

DETAILED DESCRIPTION OF THE PREFERRED EMBODIMENTS

Figure 1:
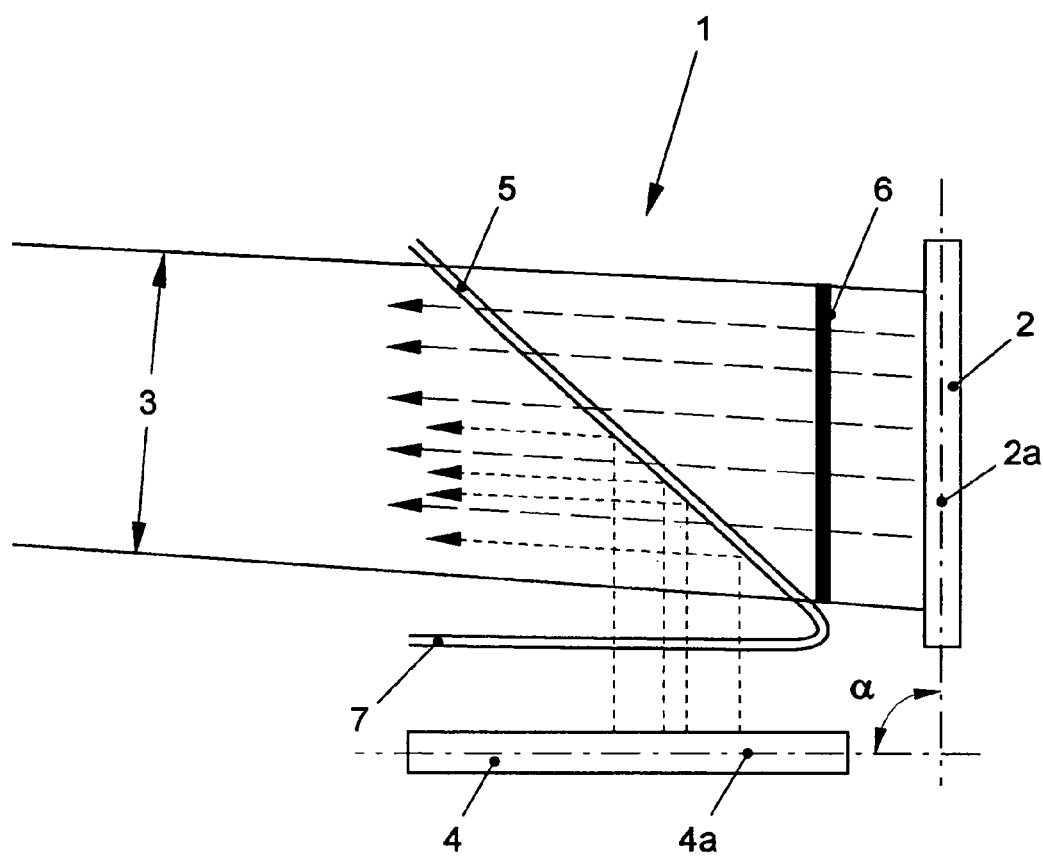
FIG. 1 is the schematic layout of an instrument cluster according to the invention to elucidate how the information from the electronic display device and from the electromechanical display device are brought together with a combination device in order to move this combined information into the user's field of vision.

The schematic cross-section of the flush-fitted instrument cluster for a vehicle shown in FIG. 1 is generally referred to as reference number 1. The instrument cluster 1 consists of an electronic display device 2, which is located in the instrument panel in the driver's direct field of vision 3 in the vicinity of a steering wheel (not shown), and an electromechanical display device 4, which is positioned horizontally in the embodiment, below the driver's field of vision 3. The electronic display device 2 preferably involves an OLED display, while the electromechanical display device preferably involves at least one round gauge (in the subsequent embodiment, two such round gauges are used).

The gauges of the electromechanical display device 4, which are not individually detailed, are preferably of a self-luminous or an illuminated design, where the background is typically jet-black. Because of its design as an OLED or a similar form, the background of the display device 4 is typically not jet-black, but less black or dark gray (in accordance with a brightness of >0 $cd/m^2$).

The centerlines 2a and 4a of the electronic display device 2 and of the electromechanical display device 4 are advantageously positioned at an angle α of 90° in relation to each other. A combination device 5 is provided at an angle of 45° in relation to the electromechanical display device 4. With respect to combination device 5, this typically involves a planar semitransparent mirror, which is transparent for the imaging light of the electronic display device 2, so that the viewer can directly observe the display area of the display device. The imaging light of the electromechanical display device 4 is reflected by the semitransparent mirror 5, so that the viewer of the display of the electronic display device 2 perceives it to be positioned in front of it as a virtual image 6. A screen 7, made of a semitransparent material is positioned above the electromechanical second display device 4, which is transparent for the imaging light of the display device 4 and which covers the electromechanical display device 4 for the viewer at least in the switched-off state.

One problem that exists in the combined representation of information from the electronic display device 2 and the electromechanical display device 4 with their differentiating light or differentiating black backgrounds is that it causes a jump in brightness during overlapping representation, which is perceived as interference. In order to illustrate the typical conditions in this connection with a practical example and moreover represent the measure for preventing such a jump in brightness according to the invention, the following refers to FIG. 2.

Figure 2:
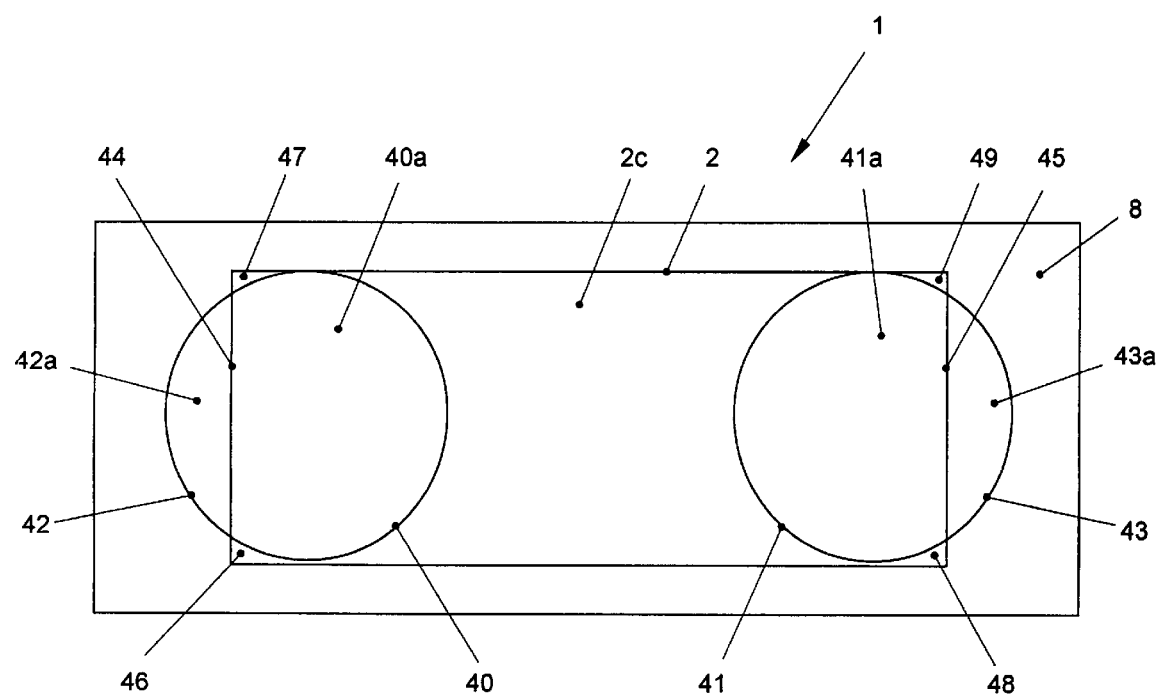
FIG. 2 is a schematic plan view of the combined representation of an electronic display device in the form of a rectangular display and of the electromechanical display device in the form of two circular gauges which project beyond the border of the rectangular display.

FIG. 2 shows a schematic plan view of the combined representations of the display devices 2 and 4, where the electromechanical display device 4 from FIG. 1 consists of two round gauges 40 and 41. Reference number 8 represents a rectangular background base of the instrument cluster 1, which shows the rectangular contour as well as the electronic display device with its background surface area 2c, which however occupies a smaller area than the background base 8. The electronic display device 2 is centered in relation to the background base 8, i.e., the long sides of the respective rectangles extend equally parallel in relation to each other as do their narrow sides, and the distance between the long sides and the narrow sides is also the same in each case.

The round gauges 40 and 41 have identical circular background surface areas. The diameter of the round gauges 40, 41 corresponds at least essentially with the illustrated embodiment as regards the length of the narrow sides of the rectangular contour of the electronic display 2. The round gauges 40, 41 are arranged in the area of the narrow sides of the rectangular electronic display device 2 so that they mostly overlap the electronic display device 2, with two non-overlapping surface areas 42 and 43, which project laterally beyond the narrow sides of the electronic display device.

As mentioned above, the background base 8 is developed jet-black and typically has a brightness of 0 cd/m$^2$ and a transmission of 0%. The brightness and transmission of the background of the round gauges 40, 41 have the same values, so that there is no difference in brightness between the non-overlapping background surface areas 42, 43 of the round gauges 40, 41 and the background base 8, and therefore no jump in brightness between these sections is perceptible. However, a totally different situation results with respect to the relationship of the round gauges 40, 41 to the electronic display device 2 regarding the respective background. There is a difference in brightness between the background surface areas 40a, 41a, which overlap with the background surface area 2c of the electronic display device 2, since the background surface area 2c, as mentioned above, is not perfectly jet-black but is less black and thus has a brightness >0 cd/m$^2$. The consequence of these variable dark background surface areas 2c and 40a, 43a is that the jump in brightness occurs at one of the transition points to the non-overlapping background surface areas 42, 43 or their background surface area 42a, 43a along one of the straight lines 44, 45 on the lateral boundaries of the electronic display device 2.

Jumps in brightness also result between the jet-black background base 8 and from the non-overlapping background surface areas of the round gauges 40, 41 from the corners of electronic display device 2 outside of the round gauges 40, 41. In FIG. 2, these locations have been marked with the reference numbers 46 to 49. Unwanted jumps in brightness at locations 46 to 48 can be avoided by coating these locations of the display device 2 or the background surface area 2c with material that has a brightness of 0 cd/m$^2$.

This measure for eliminating jumps in brightness cannot be used along the straight lines 44, 45, because the non-overlapping background surface areas 42a, 43a of the round gauges 40, 41, are effective areas for representing information on these gauges 40, 41. On these locations, another measure must therefore be applied.

The appropriate measure according to the invention provides that the non-overlapping background surface areas 42a, 43a of the round gauges 40, 41 are proportionally developed transparent or translucent.

In order to achieve a uniform dark background at least in the vicinity of the round gauges 40, 41 during a combined representation of the display device 2 and the round gauges 40, 41, the transparency and/or brightness of the non-overlapping background surface areas 42a, 43a can be controlled, i.e., they can be matched to the transparency and the brightness of the overlapping background surface areas 40a, 41a. In this way, a uniform background for the round gauges 40, 41, can be created by increasing the brightness and/or transparency of the non-overlapping background surface areas 42a and 43a.

In order to attain uniform blackness across the entire surface of their respective background during the exclusive display of the round gauges 40, 41 (when display device 2 is switched off), the increase in transparency or translucency and/or in the brightness of the non-overlapping background surface areas 42a and 43a can be optionally eliminated or reversed in order to achieve preferential transmission and/or brightness of 0% or 0 cd/m$^2$ there.

To avoid an unwanted jump in brightness along the straight lines 44, 45, an alternative measure according to the invention also provides for the development of the overlapping surface areas 40a, 41a of the round gauges 40, 41 to be reversibly transparent or translucent, and/or to match the brightness of these areas, together with an appropriate adjustment of the non-overlapping background surface areas 42a, 43a so that the background of the round gauges 40, 41 is evenly higher across the entire surface of these gauges across their total surface than during the blanking of these areas, the exclusive display of the round gauges 40, 41, while the display device is either blanked out or switched off.

The present invention is not limited to the above described embodiment, and one skilled in the art will be able to incorporate the present invention into other embodiments that fall within the scope of the claims. Moreover, while there has been shown and described what is at present considered the preferred embodiment of the invention, it will be obvious to those skilled in the art that various changes and modifications can be made therein without departing from the scope of the invention defined by the appended claims.

REFERENCE NUMBERS

1 Instrument cluster
2 Display device
2a Centerline
2c Display device background
3 Field of vision
4 Display device
4a Centerline
5 Combination device
6 Virtual image
7 Screen
8 Background base
40 Round gauge
40a Background surface area
41 Round gauge
41a Background surface area
42 Background surface area
42a Background surface area
43 Background surface area
43a Background surface area
44 Straight line
45 Straight line
46 Background section
47 Background section
48 Background section

The invention claimed is:

1. A flush-fitted instrument cluster for a motor vehicle, said instrument cluster comprising:
   a first display device (2) displaying a first image located in a direct field of vision (3) of a viewer, said first image including a background surface area (2c);
   a second display device (4; 40, 41) arranged at an angle to the first display device (2) and displaying a second image including a background surface area (40a, 42a; 41a, 43a); and
   a reflecting optical combination device (5) selectively displaying the second image in the field of vision (3) of the viewer with the first image, the first image and the second image not completely overlapping in the field of vision (3) of the viewer to form an overlapping surface area (40a, 41a) and non-overlapping surface area (42a, 43a), wherein at least one of transparency and brightness of the non-overlapping surface area (42a, 43a) being adjusted to minimize an unwanted jump in brightness when the background surface area (40*a*, 42*a*; 41*a*, 43*a*) of the second display device (4; 40, 41) and the background surface area (2*c*) of the first display device (2) have varying degrees of luminance between the overlapping surface area (40*a*, 41*a*) and the non-overlapping surface area (42*a*, 43*a*).

2. The instrument cluster as in claim 1, in which the one of the brightness and transparency of the non-overlapping surface area (42*a*, 43*a*) is adjusted to correspond to the brightness of the overlapping surface area (40*a*, 41*a*).

3. The instrument cluster as in claim 1, in which one of the brightness and transparency of the overlapping surface area (40*a*, 41*a*) is also controlled such that the brightness of the background surface area (40*a*, 42*a*; 41*a*, 43*a*) does not completely overlap.

4. The instrument cluster as in claim 1, in which one of the transparency and brightness of the background surface area (40*a*, 42*a*; 41*a*, 43*a*) of the second display device (4; 40, 41) is controlled to blank out the background surface area (40*a*, 42*a*; 41*a*, 43*a*) of the second display device (4; 40, 41).

5. The instrument cluster as in claim 1, in which the background surface area (40*a*, 42*a*; 41*a*, 43*a*) of the second display device (4; 40, 41) is darker than the background surface area (2*c*) of the first display device (2).

6. The instrument cluster as in claim 1, in which the second display device (4; 40, 41) consists of two spatially separated second display devices (40, 41) are positioned on lateral boundaries of the first display device (2) and which project partially beyond them.

7. The instrument cluster as in claim 6, in which the second display devices (40, 41) are round gauges.

8. The instrument cluster as in claim 1, in which said second display device (40, 41) is one of an illuminated display device and self-luminous display device.

9. The instrument cluster as in claim 1, in which said first display device (2) is an LED display device.

* * * * *

UNITED STATES PATENT AND TRADEMARK OFFICE
CERTIFICATE OF CORRECTION

PATENT NO. : 7,602,352 B2 Page 1 of 1
APPLICATION NO. : 11/270126
DATED : October 13, 2009
INVENTOR(S) : Thomas Kiesewetter It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1008 days.

Signed and Sealed this

Fifth Day of October, 2010

David J. Kappos
*Director of the United States Patent and Trademark Office*